(12) United States Patent
Teimel

(10) Patent No.: US 8,742,639 B2
(45) Date of Patent: Jun. 3, 2014

(54) CONNECTION MODULE FOR DC MOTORS

(75) Inventor: Arnold Teimel, Giswil (CH)

(73) Assignee: Maxon Motor AG, Sachseln (CH)

( * ) Notice: Subject to any disclaimer, the term of this patent is extended or adjusted under 35 U.S.C. 154(b) by 280 days.

(21) Appl. No.: 12/983,668

(22) Filed: Jan. 3, 2011

(65) Prior Publication Data

US 2011/0169362 A1 Jul. 14, 2011

(30) Foreign Application Priority Data

Jan. 8, 2010 (EP) .................................... 10150334

(51) Int. Cl.
*H02K 5/00* (2006.01)

(52) U.S. Cl.
USPC ......................................................... 310/91

(58) Field of Classification Search
USPC .............. 310/89, 91; 248/558, 603, 629, 638, 248/645, 674
See application file for complete search history.

(56) References Cited

U.S. PATENT DOCUMENTS

| | | | | |
|---|---|---|---|---|
| 1,822,342 | A * | 9/1931 | Ehrlich ............................ | 310/91 |
| 3,760,209 | A | 9/1973 | Hult | |
| 3,787,014 | A * | 1/1974 | Story et al. ..................... | 248/558 |
| 3,830,595 | A * | 8/1974 | Carpenter et al. ............. | 417/363 |
| 3,941,339 | A * | 3/1976 | McCarty ....................... | 248/603 |
| 4,227,101 | A * | 10/1980 | Malakian et al. ............... | 310/91 |
| 5,113,104 | A | 5/1992 | Blaettner et al. | |
| 5,172,022 | A * | 12/1992 | Ketola ............................ | 310/91 |
| 5,825,115 | A * | 10/1998 | Kronenberg et al. .. | 310/216.099 |
| 7,847,449 | B2 * | 12/2010 | Oberle et al. ................... | 310/89 |
| 8,030,815 | B2 * | 10/2011 | Shimizu .......................... | 310/91 |
| 2004/0017121 | A1 * | 1/2004 | Bailey et al. .................... | 310/89 |
| 2008/0197733 | A1 | 8/2008 | Oberle et al. | |

FOREIGN PATENT DOCUMENTS

| | | |
|---|---|---|
| DE | 690 25 317 C2 | 11/1996 |
| DE | 203 02 174 U | 9/2004 |
| DE | 10 2004 011 666 | 4/2005 |
| DE | 10 2005 030 217 | 1/2007 |
| DE | 10 2007 049 209 | 8/2008 |
| JP | 2003-189531 | 7/2003 |

OTHER PUBLICATIONS

Chinese Office Action (Notification of the First Office Action) dated Dec. 4, 2013, issued by the State Intellectual Property Office of the People's Republic of China in corresponding Chinese Patent Application No. 201110005772.0, and English language translation of Office Action. (12 pages).

* cited by examiner

*Primary Examiner* — Tran Nguyen
(74) *Attorney, Agent, or Firm* — Buchanan Ingersoll & Rooney PC

(57) ABSTRACT

A DC motor is disclosed which includes a motor housing and at least one connection module adapted to be installed on the motor housing. The DC motor can be compact, flexibly adaptable to customer requirements and also easily installable in the case of a confined installation space. For this purpose, the motor housing can include a front-sided centering elevation or centering recess which cooperates with a centering recess or a centering elevation on the connection module. The connection module can be freely rotatable in a mounting state on the motor housing, and non-rotatably connected to the motor housing in the mounted state.

15 Claims, 2 Drawing Sheets

CONNECTION MODULE FOR DC MOTORS

The present invention relates to a DC motor comprising a motor housing and at least one connection module adapted to be installed on the motor housing.

In former customary small-power DC motors the motor housing often consisted of a part that combined the functions of an outside yoke for the field of the permanent magnet and a connection flange with defined drill pattern. The motor housing is normally turned from the solid. In cases where the precision requirements are slightly lower, it is also known that the motor housing is produced by way of a deep-drawing technique and that the connection threads are reworked.

Furthermore, designs for motor housings are also known in the case of which the outside yoke for the field of the permanent magnet and the connection flange with the defined drill pattern are separate parts that are interconnected by pressing, welding, screwing, bolting or similar connection measures in a fixed angular position.

All of these motor housings have a fixed design and a fixed structure. If a customer needs a different drill pattern for fastening the motor to the intended place, this means that the motor has to be rebuilt from scratch because either the motor housing has to be adapted in a corresponding way or the connection flange has to be adapted to the customer's specification.

To implement such modifications, it is therefore already known that an adapter plate which has the drill pattern desired by the customer is attached to the front side of the motor housing. This permits a faster delivery because an already finished motor can be bought to which the corresponding adapter plate has just to be attached. The drawbacks are here the additional mounting efforts for fastening the adapter plate, the additional overall length due to the adapter plate and the costs for the additional adapter plate.

U.S. Pat. No. 4,227,101 shows a stepper motor with an adapter ring. The adapter ring serves to fasten the stepper motor at an installation place and has a connection drill pattern for this purpose. The motor housing of the stepper motor is provided on its front side with an aligning or centering projection and with threaded holes for connection with the adapter ring. The adapter ring is provided with a central bore and with three arcuate elongated holes formed on its circumference. The adapter ring is attached to the motor housing, so that the centering projection of the motor housing projects through the bore of the adapter ring. Screws which are inserted into the threaded holes of the motor housing and slightly tightened are arranged in the arcuate elongated holes of the adapter ring. In this mounting position the adapter ring is thus loosely fastened to the motor housing by means of the screws. In the mounting position the adapter ring is still rotatable to the extent allowed by the elongated holes. The adapter ring can thus be rotated to a limited degree. The motor shaft can thus be brought into the desired position in relation to the connection drill pattern in the adapter ring. After this has been done, the screws are firmly tightened in the elongated holes, so that the adapter ring in the mounted state is firmly connected to the motor housing. Since the adapter ring can only be rotated to a limited degree, only certain positions of the connection drill pattern can be set.

DE 690 25 317 C2 describes a small-power electric motor with a mounting flange. The small-power electric motor can be fastened with the mounting flange at the desired installation place. The mounting flange comprises a pot-shaped section with which it is attached to the circumferential surface of the motor housing of the small-power electric motor. In this position the mounting flange and the motor housing are glued to one another. A drawback is here that the small-power electric motor needs quite a lot of installation space.

Another drawback is that in the case of brushed DC motors the brush lid is normally rotated relative to the stator with the permanent magnets mounted in the stator so as to set the commutation. The angular position of the electrical connections in relation to the drill pattern of the connection flange is therefore not defined. Differences of up to ±25° may occur in the various motors. This may pose problems above all in applications with a confined installation space or when several motors have to be installed very closely side by side.

It is therefore the object of the present invention to provide a DC motor that overcomes the drawbacks of the solutions known from the prior art and is particularly compact, flexibly adaptable to customer needs and also easily installable in case of a narrow installation space.

To this end it is provided according to the invention that the motor housing comprises a front-sided centering elevation or centering recess which cooperates with a centering recess or a centering elevation on the connection module, and that the connection module is freely rotatable in a mounting state on the motor housing and is non-rotatably connected to the motor housing in the mounted state.

The connection module which offers the fastening options for fastening the motor to the intended installation place is mounted on the front side of the motor housing. Hence, the connection module has the function of a connection flange. The connection module is attached to the front side of the DC motor, so that the centering elevation or the centering recess of the connection module engages into the centering recess of the DC motor or surrounds the centering elevation of the DC motor. Since the connection module is freely rotatable in the mounting state, it can be rotated into any desired position. In this position the connection module is fixedly connected to the motor housing, so that in the mounted state it is non-rotatably installed on the motor housing. Therefore, the connection module can be fastened in any desired position to the motor housing. The front side of the motor housing is without connection bores. Therefore, the wall thickness of the front side of the housing may be relatively thin, so that a housing of minimal length can be implemented. This makes the DC motor compact and inexpensive. On the assembly line for the DC motor, there is no need to consider any variants regarding the connection geometry. The assembly devices need therefore not be retrofitted, and only small efforts have to be taken for the assembly of the DC motor. The customer-specific connection geometry is implemented on the finish-assembled DC motor in that a corresponding module is mounted. This results in a short throughput time for customer-specific modifications. The DC motor can be a brushed or also a brushless DC motor.

Advantageously, it may be provided that a bearing for the motor shaft of the DC motor is arranged on the front side of the motor housing, projects at least in part beyond the front side of the motor housing and forms the centering elevation, and that the connection module is attached to the bearing. A further shortening of the overall length of the motor can thereby be accomplished. The connection module is only aligned on the bearing of the DC motor. This improves precision and tolerance, respectively.

Expediently, it may be provided that the front side of the motor housing has formed thereon a bearing seat which is accessible from the outside and has arranged therein the bearing, the height of the bearing seat being smaller than the height of the bearing. Hence, the motor is of simple construction, whereby the assembly is simplified.

In a further variant, it may be provided that the connection module is connected by gluing, welding or a forming process to the motor housing. The connection module can thereby be easily fixed to the motor housing; in the mounted state a subsequent adjustment, e.g. during transportation, is no longer possible.

In a still further embodiment it may be provided that the connection module in the mounted state is arranged in a precise angular position relative to the electrical connections of the DC motor. This is especially important in the case of brushed DC motors. The connection module is mounted on the finish-assembled motor on which the commutation has already been set. The angular position of the electrical connections of the motor is therefore already fixed during installation of the connection module. Since the connection module is freely rotatable in the mounting state and can be rotated into any desired position, the electrical connections can therefore be moved into the desired position in relation to the fastening of the DC motor, i.e., in relation to the connection module. The installation space into which the DC motors are installed can thus be utilized in an appropriate way. The DC motors can be narrowly installed side by side as the position of the connections is known.

Furthermore, it may be provided that the connection module has a connection drill pattern for connection to a connection point. This permits a simple fastening of the DC motor at the desired position by way of bolting.

Alternatively, however, it may also be provided that the connection module comprises at least one fastening rib for fastening to a connection point. This also permits a very easy fastening of the DC motor.

Embodiments of the present invention shall now be explained in more detail with reference to drawings, in which.

Figure 1:
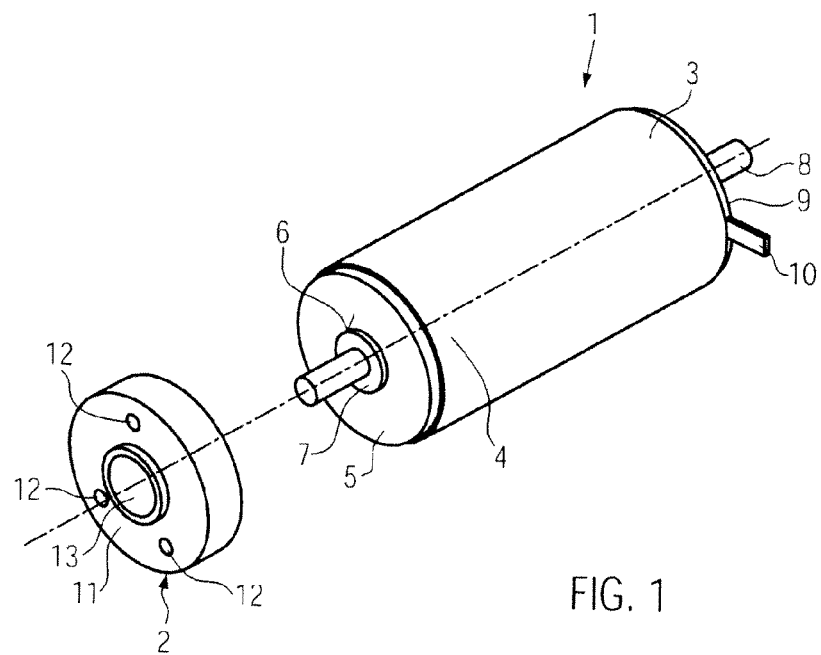
FIG. 1 is an exploded view of the DC motor.

FIG. 1 is an exploded illustration of the DC motor 1. The DC motor may be configured as a brushed DC motor or as a brushless DC motor. In the illustrated case a brushed DC motor is concerned. The DC motor 1 comprises a motor housing 3 and the connection module 2. The motor housing 3 is preferably pot-shaped. This means that the motor housing 3 has a circumferential surface 4 integrally connected to the motor housing bottom 5. A bearing seat 6 is formed in the motor housing body 5. A bearing 7 in which an end of the motor shaft 8 is supported is arranged in the bearing seat 6.

Hence, the motor housing bottom 5 forms a front side of the motor housing 3. The motor housing 3 is open on the front side of the DC motor 1 that is opposite to the motor housing bottom 5. A brush lid 9 with electrical connections 10 mounted thereon is fastened there.

The bearing seat 6 on the front side and on the motor housing bottom 5, respectively, of the motor housing 3 of the DC motor 1 is accessible from the outside and configured such that its height is smaller than the height of the bearing 7 which is mounted in the bearing seat 6. Hence, the bearing 7 projects outwards beyond the motor housing bottom 5 while forming a centering elevation. The motor housing bottom 5 is of a very simple construction, except for the bearing seat 6, and is particularly without connection bores for fastening the DC motor 1 to a connection point.

On its back side the connection module 2 comprises a centering recess. The centering recess is approximately circular, the outer diameter of the centering recess being slightly greater than the outer diameter of the bearing 7. The connection module 2 is coaxially attached with respect to the motor shaft 8 on the motor housing 3 of the DC motor 1. The bearing 7 is then arranged in the centering recess of the connection module 2 and thereby centers the connection module 2 on the motor housing 3. Since the diameter of the centering recess of the connection module 2 is slightly greater than the outer diameter of the bearing 7, the connection module 7 is still rotatable after attachment to the motor housing 3.

On its front side 11 facing away from the motor housing bottom 5, the connection module 2 has fastening options for fastening the DC motor 1 to the desired installation place, e.g. in a passenger car. In the illustrated case, bores 12 are provided for this purpose. The drill pattern formed by the bores 12 conforms to the customer-specific requirements. Hence, the position of the bores 12 is defined in conformity with the customer requirements. It is also possible to provide other fastening means, e.g. fastening ribs.

The connection module 12 is fixedly connected to the motor housing 3 of the DC motor 1. For instance, the connection module 2 can be connected by welding, gluing, pressing or shrinking to the motor housing 3.

Figure 2:
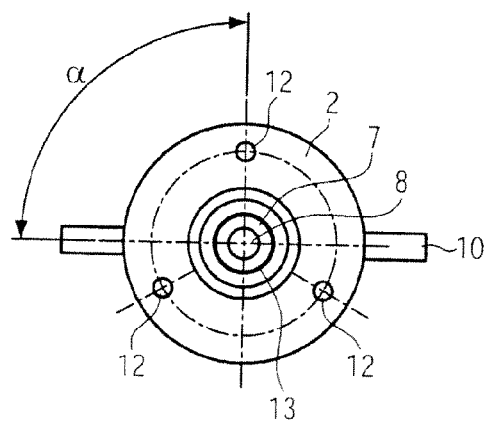
FIG. 2 is a view of the DC motor from the front.

FIG. 2 shows the DC motor 1 with the connection module 2 of FIG. 1 as mounted thereon, from the front. The connection module 3 comprises three bores 12 by means of which the DC motor 1 can be mounted at the desired installation place, e.g. in an automotive vehicle. Like the motor housing 3 of the DC motor 1, the connection module 2 has a round cross-section, but may also have a square, triangular or oval shape with bores outside the motor diameter that also permit a fastening operation from the back side, under installation conditions in the case of which the front side is not accessible. The connection module 2 is centrally provided with a bore 13 that serves as a passage for the motor shaft 8. The diameter of the bore 13 is greater than the diameter of the motor shaft 8, so that the bearing 7 can also be seen. On the back side of the connection module 2, this bore 13 is increased in diameter and forms the centering accommodation means that is attached to the bearing 7. The connection module 7 is mounted in a precise angular position relative to the electrical connections 10 of the DC motor 1 on the motor housing 3. The angle α between the bores 12 and the electrical connections 10 can be set with an accuracy of about ±2°.

Figure 3:
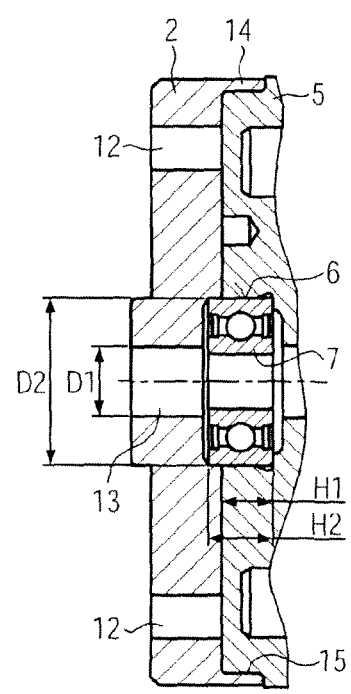
FIG. 3 is a section through the front side of the motor housing of the DC motor with the connection module mounted thereon.

FIG. 3 shows a cross section through the front side of the motor housing 3, i.e. the motor housing bottom 5, with the connection module 2 fastened thereto. The bearing seat 6 is centrally formed in the motor housing bottom 5. The bearing 7 for the motor shaft is mounted in the bearing seat 6. The motor shaft is not illustrated in FIG. 3. The height H1 of the bearing seat 6 is smaller than the height H2 of the bearing 7. Therefore, the bearing 7 projects beyond the motor housing bottom 5 to the outside. Hence, the bearing 7 forms a centering elevation. To permit a good hold of the bearing 7 in the motor housing 3, the height 1 of the bearing seat 6 should conform at least to half the height H2 of the bearing 7. This means $H1 \geq 0.5 \cdot H2$. However, the height H1 of the bearing seat 6 should also not be too great, so that a centering elevation is also formed on the front side of the motor housing bottom 5 by the bearing 7. Preferably, the height H1 of the bearing seat 6 is therefore in a range of about ⅔ to ⅘ of the height H2 of the bearing.

The connection module 2 has a central bore 13. The bore 13 is stepped. This means that the bore 13 along its longitudinal extension is distinguished by two portions having different diameters. In the portion facing the back side of the connection module 2, the bore 13 has a diameter D2. This diameter D2 conforms approximately to the diameter of the bearing 7. Hence, in this portion the bore 13 is configured as a centering recess. The connection module 2 is attached to the motor housing 3, so that the portion with the diameter D2 of the bore 13 is attached to the bearing 7. In the portion facing the front side of the connection module 2, the diameter D1 of the bore 13 is smaller. Hence, a stop for the bearing 7 is here formed. The diameter D1 is sufficiently large so that the motor shaft of the DC motor 2 can exit to the outside.

Furthermore, the fastening bores 12 are formed in the connection module 2. As has already been described, both the motor housing 3 and the connection module 2 are of a substantially circular diameter. On its outer end, the motor housing bottom 5, a small shoulder 15 is formed in the motor housing 3. The diameter of the motor housing 3 in this portion is thus smaller than the diameter of the motor housing 3 in the central portion. On its circumference the connection module 2 has a projecting rib 14, the inner diameter of the rib 14 being slightly larger than the outer diameter of the tapered point 15 of the motor housing bottom 5. The rib 14 of the connection module 2 therefore comes to rest in the tapered portion 15 of the motor housing bottom 5, whereby the connection module 2 is additionally centered and stabilized on the motor housing 3.

The mounting of the connection module 2 on the motor housing 3 of the DC motor 1 shall now be explained briefly with reference to the drawings. First of all, the DC motor 1 is mounted. Since the illustrated DC motor is a brushed DC motor, the brush lid 9 with the electrical connections 10 provided thereon is mounted on the motor housing 3 of the DC motor 1 for finishing the assembly of the DC motor 1. For setting the commutation of the DC motor 1 the brush lid is rotated relative to the stator arranged in the motor housing 3 with the magnets mounted in the stator. The brush lid 9 is then fixed in the desired position, so that the position of the electrical connections 10 of the DC motor 1 is defined. The bearing 7 is inserted into the bearing seat 6 of the motor housing 3 and projects outwards beyond the motor housing bottom 5.

Thereafter the connection module 2 is attached to the front side of the DC motor 1 that is formed by the motor housing bottom 5. The motor shaft 8 is here passed through the bore 13 which is centrally formed in the connection module 2. On the back side of the connection module 2 the bore 13 has an enlarged diameter and forms a centering recess with the diameter D2. The diameter D2 of the centering recess is slightly greater than the outer diameter of the bearing 7. As has already been described, the bearing 7 projects beyond the front side of the DC motor 1. This is due to the fact that the height H1 of the bearing seat 6, which is formed in the front side or the motor housing bottom 5, is smaller than the height H2 of the bearing 7. With the bearing 7 and the centering recess on the back side of the connection module 2 the connection module 2 is centered on the DC motor 1. The connection module 2 is attached to the motor 1 to such an extent that the back side of the connection module 2 rests on the motor housing bottom 5. The connection module is still in the mounting state. Since the diameter of the centering recess of the connection module 2 is slightly greater than the outer diameter of the bearing 7, the connection module 2 is still freely rotatable in the mounting state and can thus be moved into any desired position.

The connection module 2 is now rotated to such an extent that the bores 12 or another fastening means formed on the connection module 2, e.g. a fastening rib, have the desired angular position relative to the electrical connections 10 of the DC motor 1 or relative to the fastening points at the installation place of the DC motor. When the connection module 2 is in the desired position, the connection module 2 is firmly connected to the motor housing 3. For instance, the connection module 2 can be welded, glued, pressed or shrunk onto the motor housing 3. Motor housing 3 and connection module 2 are thus in the mounted state.

The overall length of the DC motor 1 with the motor housing 3 and the connection module 2 mounted thereon corresponds approximately to the length which the formerly known small-power DC motors without additional adapter plate also had.

The invention claimed is:

1. A DC motor comprising:
a motor housing; and
at least one connection module for installation on the motor housing, the connection module being configured to attach the DC motor to an object, wherein the motor housing includes one of a front-sided centering elevation or centering recess, for cooperating with the other of a centering recess or a centering elevation on the connection module, and wherein in a first mounting state the connection module abuts a front side of the motor housing such that the centering projection of one of the motor housing and the connection module projects into the centering recess of the other of the motor housing and the connection module, the connection module is freely rotatable around the centering projection or centering recess into any predetermined position relative to the motor housing, and wherein in a second mounted state the connection module is non-rotatably and fixedly connected to the motor housing in said predetermined position,
wherein the motor housing includes the centering elevation, comprising:
a bearing for a motor shaft of the DC motor, the bearing arranged on a front side of the motor housing, projects at least in part beyond the front side of the motor housing and forms the centering elevation, and wherein the connection module is attached to the bearing.

2. The DC motor according to claim 1, wherein the front side of the motor housing has formed thereon a bearing seat which is accessible from outside and has arranged therein the bearing, a height of the bearing seat being smaller than a height of the bearing.

3. The DC motor according to claim 1, wherein the connection module is connected by glue or by a weld to the motor housing, or is formed as part of the motor housing.

4. The DC motor according to claim 1, wherein the connection module in the mounted state is arranged in a precise angular position relative to electrical connections of the DC motor.

5. The DC motor according to claim 1, wherein the connection module comprises:
a connection drill pattern for connection to a connection point.

6. The DC motor according to claim 1, wherein the connection module comprises:
at least one fastening rib for fastening to a connection point.

7. The DC motor according to claim 2, wherein the connection module is connected by glue or by a weld to the motor housing, or is formed as part of the motor housing.

8. The DC motor according to claim 2, wherein the connection module in the second mounted state is arranged in a precise angular position relative to electrical connections of the DC motor.

9. The DC motor according to claim 2, wherein the connection module comprises:

a connection drill pattern for connection to a connection point.

10. The DC motor according to claim 2, wherein the connection module comprises:
at least one fastening rib for fastening to a connection point.

11. A DC motor comprising:
a motor housing; and
at least one connection module for installation on the motor housing, the connection module being configured to attach the DC motor to an object, wherein the motor housing includes one of a front-sided centering elevation or centering recess, for cooperating with the other of a centering recess or a centering elevation on the connection module, and wherein in a first mounting state the connection module abuts a front side of the motor housing such that the centering projection of one of the motor housing and the connection module projects into the centering recess of the other of the motor housing and the connection module, the connection module is freely rotatable around the centering projection or centering recess into any predetermined position relative to the motor housing, and wherein in a second mounted state the connection module is non-rotatably and fixedly connected to the motor housing in said predetermined position;
wherein the connection module comprises:
a connection drill pattern for connection to a connection point.

12. The DC motor according to claim 8, wherein the connection module comprises:
a connection drill pattern for connection to a connection point.

13. A DC motor comprising:
a motor housing; and
at least one connection module for installation on the motor housing, the connection module being configured to attach the DC motor to an object, wherein the motor housing includes one of a front-sided centering elevation or centering recess, for cooperating with the other of a centering recess or a centering elevation on the connection module, and wherein in a first mounting state the connection module abuts a front side of the motor housing such that the centering projection of one of the motor housing and the connection module projects into the centering recess of the other of the motor housing and the connection module, the connection module is freely rotatable around the centering projection or centering recess into any predetermined position relative to the motor housing, and wherein in a second mounted state the connection module is non-rotatably and fixedly connected to the motor housing in said predetermined position;
wherein the connection module comprises:
at least one fastening rib for fastening to a connection point.

14. The DC motor according to claim 8, wherein the connection module comprises:
at least one fastening rib for fastening to a connection point.

15. A DC motor comprising:
a motor housing;
at least one connection module for installation on the motor housing, the connection module being configured to attach the DC motor to an object, wherein the motor housing includes one of a front-sided centering elevation or centering recess, for cooperating with the other of a centering recess or a centering elevation on the connection module, and wherein in a mounting state the connection module is attached to a front side of the motor housing such that the centering projection of one of the motor housing and the connection module projects into the centering recess of the other of the motor housing and the connection module, the connection module is freely rotatable around the centering projection or centering recess into any predetermined position relative to the motor housing, and wherein in the mounted state the connection module is non-rotatably and fixedly connected to the motor housing in said predetermined position; and
wherein the front side of the motor housing has formed thereon a bearing seat which is accessible from outside and has arranged therein the bearing, a height of the bearing seat being smaller than a height of the bearing.

* * * * *